United States Patent

Nakagawa et al.

[11] 4,246,874
[45] Jan. 27, 1981

[54] INTERNAL COMBUSTION ENGINE WITH DUAL INDUCTION SYSTEM AND WITH FUEL INJECTION SYSTEM TO DISCHARGE FUEL INTO PRIMARY INDUCTION SYSTEM

[75] Inventors: Yasuhiko Nakagawa, Kamakura; Yukihiro Etoh, Yokohama; Meroji Nakai, Yokosuka; Ryoji Nakajima, Yokohama, all of Japan

[73] Assignee: Nissan Motor Company, Limited, Japan

[21] Appl. No.: 966,374

[22] Filed: Dec. 4, 1978

[30] Foreign Application Priority Data

Dec. 19, 1977 [JP] Japan .................................. 52-152552

[51] Int. Cl.³ ............................................ F02B 31/00
[52] U.S. Cl. .................................... 123/308; 123/432
[58] Field of Search ............. 123/75 B, 127, 139 AW, 123/32 SP, 32 ST, 32 EA, 30 C, 79 C, 188 M; 261/63, 69 A

[56] References Cited

U.S. PATENT DOCUMENTS

| 2,798,703 | 7/1957 | Carlson | 123/127 |
| 3,364,911 | 1/1968 | Baudry | 123/75 B |
| 3,678,905 | 7/1972 | Diehl | 123/75 B |
| 3,713,630 | 1/1973 | Laprade | 123/139 AW |
| 3,882,831 | 5/1975 | Date | 123/32 SP |
| 3,884,197 | 5/1975 | Miyaki | 123/32 SP |
| 4,077,363 | 3/1978 | Noguchi | 123/75 B |

Primary Examiner—Ronald H. Lazarus
Attorney, Agent, or Firm—Lowe, King, Price & Becker

[57] ABSTRACT

A spark ignition fuel injection reciprocatory internal combustion engine with dual induction system has within a cylinder head a primary intake passage to direct air fuel mixture charge into a cylinder to swirl therein and a secondary intake passage to direct air charge into the cylinder in such a direction as to impede the swirling motion of the air fuel mixture charge, thereby to maintain the volumetric efficiency of the engine at a sufficiently high level. A fuel injector is so positioned as to discharge fuel into the primary intake passage. An air flow sensor is provided upstream of primary and secondary throttle valves to detect the total of flow of induction air fed to the engine so that fuel is discharged at a rate proportional to the total induction air flow. Under engine operating conditions when only the primary throttle valve opens, air fuel mixture charge will swirl at a sufficiently high rate as to enhance evaporation and dispersion of fuel droplets. Under engine operating conditions when both the primary and secondary throttle valves open, the air fuel mixture charge issuing from the primary intake passage is enriched and air charge from the secondary intake passage impedes swirling motion of enriched air fuel mixture charge from the primary intake passage to enhance evaporation and dispersion of fuel droplets.

7 Claims, 6 Drawing Figures

INTERNAL COMBUSTION ENGINE WITH DUAL INDUCTION SYSTEM AND WITH FUEL INJECTION SYSTEM TO DISCHARGE FUEL INTO PRIMARY INDUCTION SYSTEM

BACKGROUND OF THE INVENTION

The present invention relates to an internal combustion engine with a dual inductive system including a primary induction system to direct a first fluid charge into a cylinder to swirl therein under all operating conditions of the engine and a secondary induction system to direct a second fluid charge into the cylinder in such a direction as to impede and reduce the swirling motion of the first fluid charge issuing from the primary induction system under predetermined operating conditions of the engine, thereby maintaining the volumetric efficiency of the engine at a sufficiently high level. More particularly, the invention relates to an arrangement of fuel injectors of a fuel injection system for an internal combustion engine of the above type.

In the case of installing a fuel injection in the engine with dual induction system as mentioned above, it is possible to arrange two fuel injectors per each cylinder, one for discharging fuel into a primary intake port passage and the other into a secondary intake port passage. This arrangement requires twice the number of fuel injectors as required in the usual fuel injection system for an engine with a single induction system. Furthermore, a complicated control for the fuel injector for the secondary intake port passage is required, thus boosting the cost of the fuel injection system.

SUMMARY OF THE INVENTION

The invention includes a cylinder having a piston reciprocably mounted therein. A cylinder head is positioned over one end of the cylinder. A primary induction system is provided which is adapted to direct air into the cylinder to swirl therein under all operating conditions of the engine, and a secondary induction system is provided which is adapted to direct air into the cylinder in such a direction as to impede and reduce the swirling motion under predetermined operating conditions of the engine. A fuel injector is so positioned as to discharge fuel into flow of air through the primary induction system.

An object of the present invention is to provide an internal combustion engine with dual induction system in which with a single injector per cylinder an appropriate amount of fuel can be fed to the corresponding cylinder without requiring complicated control as compared to a fuel injection system for an internal combustion engine with a single induction system.

BRIEF DESCRIPTION OF THE DRAWINGS

In the accompanying drawings.

DESCRIPTION OF THE PREFERRED EMBODIMENTS

Figure 1:
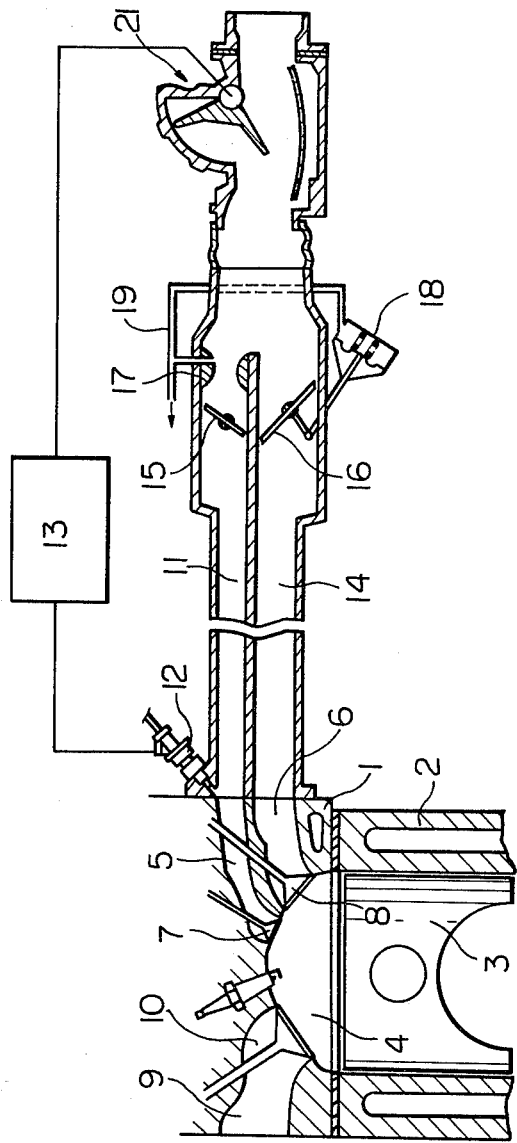
FIG. 1 is a diagrammatic longitudinal sectional view of a first preferred embodiment of an internal combustion engine with a dual induction system and with a fuel injection system according to the present invention.
Figure 2:
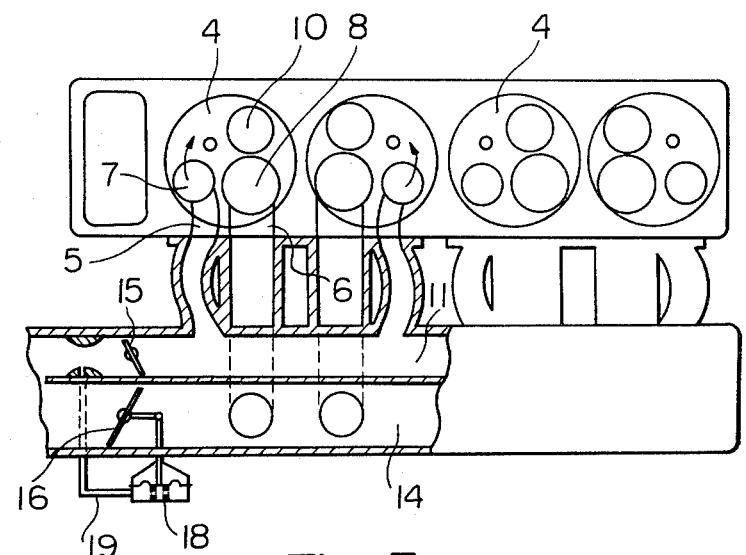
FIG. 2 is a top plan view of part of the engine.

FIGS. 1 and 2 show a first preferred embodiment employing an internal combustion engine having separate primary and secondary intake valves for each cylinder.

In these Figures, the reference numeral 1 denotes a cylinder head, the reference numeral 2 a cylinder block, the reference numeral 3 denotes a piston, and the reference numeral 4 a combustion chamber.

Each combustion chamber 4 is provided with a primary intake port passage 5 positioned within the cylinder head 1 and with a secondary intake port passage 6 positioned within the cylinder head 1. Induction air is drawn into the corresponding chamber 4 from the primary port passage 5 under all engine operating conditions of the engine, and at high loads air is drawn into the chamber 4 from both of the primary and secondary intake port passages 5 and 6.

The primary port passage 5 is so curved as to direct air tangentially into cylinder to swirl around the cylinder axis. The secondary port passage 6 has a larger cross sectional area than the primary intake port passage 5 and has such a configuration as to provide less resistance to induction of air therethrough. In particular, the secondary port passage is so angled as to direct air into the combustion chamber 4 in a direction to impede and reduce the swirling motion within the combustion chamber 4.

A primary intake valve 7 is reciprocably mounted within the cylinder head 1 for closing and opening the primary intake port passage 5, and a secondary intake valve 8 is reciprocably mounted within the cylinder head 1 for closing and opening the secondary intake port passage 6. An exhaust valve 10 is reciprocably mounted within the cylinder head 1 for opening and closing an exhaust port passage 9.

A fuel injector 12 is mounted to each primary intake manifold passage 11 connecting with the corresponding primary intake port passage 5 adjacent the end thereof at which it connects with the primary intake port passage 5. Each fuel injector 12 is actuable or energizable in response to a pulsation signal supplied from a control apparatus 13 to discharge fuel, in amount, in accordance with the total of induction air.

Connecting with each secondary intake port passage 6 is a secondary intake manifold passage 14. The primary intake manifold passage 11 extends from a common chamber having at its upstream end portion a primary throttle valve 15, while, the secondary intake manifold passages 14 extend from another common chamber having at its upstream end portion a secondary throttle valve 16. The secondary throttle valve 16 is designed to open after the primary throttle valve 15 has been opened greater than a predetermined amount.

In this embodiment the secondary throttle valve 16 is operatively connected to and actuable by a diaphragm device 18 which is operable in response to vacuum taken from a venturi 17 disposed upstream of the primary throttle valve 15. With this diaphragm device 18, the secondary throttle valve 16 begins to open when the venturi vacuum increases higher than a predetermined level.

The diaphragm device 18 may be operable on an amplified venturi vacuum which is used as a signal vacuum for operating an EGR control valve, if any.

An air flow sensor 21 is mounted upstream of the primary and secondary throttle valves 15 and 16 to detect the total amount of induction air fed to the engine so as to feed to the control apparatus 13 an electrical signal representative of the detected total of induction air.

When the engine operates at low and intermediate speeds with low and intermediate loads, the primary throttle valve 15 opens to supply air to the combustion chamber 4 through the primary intake port passage 5.

The quantity of fuel per injection from the fuel injector 12 is determined in accordance with the quantity of air flowing via the primary throttle valve 15 so that air fuel ratio of the air fuel mixture supplied to the combustion chamber 4 via the primary intake port passage 5 is maintained at a predetermined value which is slightly greater than the stoichiometry. The thus adjusted air fuel mixture will be drawn into the combustion chamber 4 to swirl therein.

Because of the swirling motion within the combustion chamber 4, the combustion will be stabilized even at a lean air fuel mixture or with heavy EGR, thus purifying the exhaust gases resulting from the combustion and improving fuel economy.

Meanwhile, when the engine operates at high speeds with high loads, the secondary throttle valve 16 will begin to open so as to supply additional air to the combustion chamber 4 via the secondary port passage 6.

Under these engine operating conditions, since the air flow sensor 21 detects the total air flow upstream of both the primary and secondary throttle valves 15 and 16, the fuel injector 12 will discharge an overabundant amount of fuel into the primary port passage 5. Thus, this enriched air fuel mixture from the primary intake port passage 5 and air from the secondary intake port passage 6 will mix with each other within the combustion chamber 4.

Since, under this engine operating condition, the total air quantity and its inflowing velocity increase sufficiently so as to provide even dispersion of fuel droplets over the whole volume of the combustion chamber 4 and since the combustion environment enhances by reduction of swirl in the chamber, stable combustion will be assured. In addition to this stable combustion, the volumetric efficiency is considerably increased, thus assuring sufficiently high output at wide open throttle.

Figure 3:
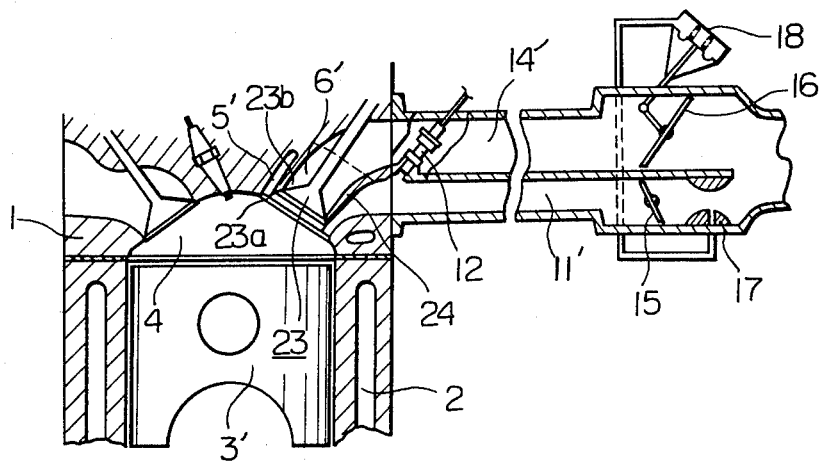
FIG. 3 is a similar view to FIG. 1 showing a second preferred embodiment.
Figure 4:
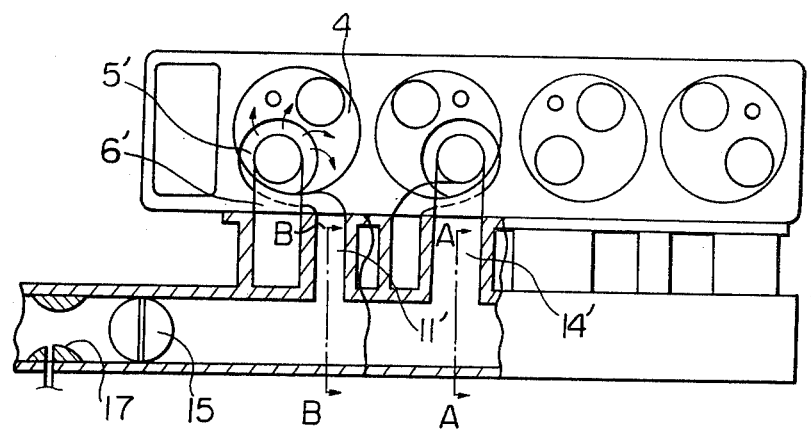
FIG. 4 is a top plan view of the engine shown in FIG. 3.
Figure 5:
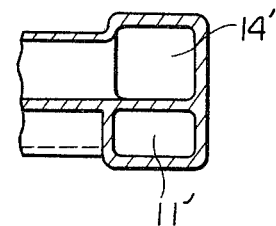
FIG. 5 is a sectional view taken through the line A—A shown in FIG. 4.
Figure 6:
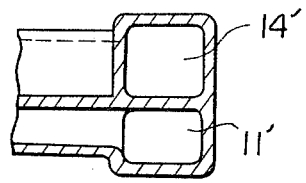
FIG. 6 is a sectional view taken through the line B—B shown in FIG. 4.

FIGS. 3 and 4 show a second embodiment in which a primary port passage 5' connects with a combustion chamber 4 at an annular port opening disposed around a circular port opening at which an output port passage 6' connects with the combustion chamber 4, a single intake valve 23 control these port passages 5' and 6'.

In this embodiment as well as in the above described embodiment, a fuel injector 12 is so positioned as to discharge fuel into a primary manifold passage 11' connecting with the primary port passage 5'.

An annular partition wall or tube 24 is mounted in a bore in a cylinder head 1 to separate the secondary intake port passage 6' from the primary port passage 5' when the intake valve 23 is in the closed position. The valve 23 includes a valve stem and a valve head having faces 23a and 23b which engage a valve seat around the bore and the adjacent end of the annular wall 24 to provide a seal between the primary and secondary port passages 5' and 6' when the intake valve is in the closed position.

Reduction in the engine performance is negligible even if the seal between the valve head of the intake 23 and the end of the annular wall 24 is degraded as a result of provision of small clearance therebetween when the valve 23 is in the closed position.

Instead of providing a plurality of fuel injectors, one for each swirl port passage 5', it is possible to provide a single fuel injector at a location from which primary intake manifold passages 11' extend toward the primary port passages 5'. In this case, these induction conduits are heated with a suitable heat source such as the engine coolant to improve evaporation and dispersion of fuel droplets.

The secondary throttle valve 16 is actuable in response to vacuum within venturi 17. If desired, the secondary throttle valve 16 may be controlled through a suitable link mechanism to be opened in response to the opening degree of the primary throttle valve 15.

Since fuel is discharged into the primary side of the induction system according to the present invention the construction and arrangement of the fuel control system has been simplified. Under engine operation conditions at low and intermediate speeds with low and intermediate loads, good evaporation and dispersion of fuel droplets is obtained and the combination of good evaporation of fuel and distribution of fuel due to strong swirling motion within the combustion chamber will bring about a good combustion environment, thus lowering exhaust emissions and improving fuel economy. Meanwhile, under engine operating conditions with high loads, sufficient output at wide open throttle can be yielded because rich air fuel mixture from the primary and air from the secondary will be mixed well because of an increase in flow velocity.

What is claimed is:

1. An internal combustion engine comprising:
   a cylinder block having a cylinder formed therein;
   a piston reciprocally mounted within said cylinder;
   a cylinder head positioned on one end of said cylinder;
   a primary induction system adapted to direct air into said cylinder to swirl about a central axis of the cylinder under all operating conditions of the engine;
   a secondary induction system adapted to direct air into said cylinder in such a direction as to impede the swirling air under a predetermined operating condition of the engine;
   means for measuring total air flow through said primary and secondary induction systems; and
   a fuel injector adapted to inject fuel only into the air flowing through said primary induction system, the quantity of fuel issuing from said fuel injector per each injection being controlled in response to said total air flow measuring means.

2. An internal combustion engine as claimed in claim 1,
   wherein said cylinder head includes a primary intake passage for directing air tangentially into said cylinder to swirl therein and a primary intake valve reciprocally mounted therewithin to which said primary intake passage leads; and
   wherein said cylinder head includes a secondary intake passage adapted to direct air into said cylinder in a direction to impede the swirling air charge and a secondary intake valve reciprocally mounted therewithin to which said secondary intake passage leads, said primary intake passage and said primary intake valve forming part of said primary induction system, said secondary intake passage and said secondary intake valve forming part of said secondary induction system.

3. An internal combustion engine as claimed in claim 1, wherein said cylinder head includes an intake valve reciprocally mounted therewithin, said intake valve including a stem and a head having a face, said cylinder head further including a primary port, a valve seat around said primary port to define the outer periphery thereof and receiving said face, an annular wall means defining the inner periphery of said primary port, and a secondary port positioned within said annular wall means and defined thereby, said cylinder head further including a primary intake passage therein in communication with said primary port and a secondary intake passage therein in communication with said secondary induction port.

4. In an internal combustion engine including means defining a cylinder having an axis and a piston slidably disposed in said cylinder to define a variable volume combustion chamber, a dual induction system comprising:

an air-flow meter, a primary induction passage leading from downstream of said air flow meter to a first valve controlled inlet port of said combustion chamber, said primary induction passage and said first inlet port being so constructed and arranged as to introduce air flowing through said primary induction passage into said combustion chamber in a direction tangential with respect to the wall of said cylinder to thereafter swirl around said axis of said cylinder, a fixed venturi disposed at the upstream end of said primary induction passage, a first throttle valve operatively disposed in said primary induction passage downstream of said venturi, a fuel injector disposed in said primary induction passage near said first inlet port for injecting fuel into said primary induction passage and substantially toward said first inlet port, fuel injector control means responsive to the output of said flow meter for controlling the amount and timing of the fuel injected by said injector, a secondary induction passage leading from downstream of said flow meter to a second valve controlled inlet port of said combustion chamber, said secondary induction passage and said second inlet port being so constructed and arranged as to introduce air flowing through said secondary induction passage into said combustion chamber in a direction which impedes the swirling of the air from said primary induction passage around said axis, a second throttle valve operatively disposed in said secondary induction passage, and a pressure differential responsive motor fluidly connected with said venturi and operatively connected to said second throttle valve for moving said second throttle valve in response to the degree of vacuum at said venturi.

5. The system as claimed in claim 4, wherein said first and second inlet ports are controlled by a commom inlet valve.

6. The system as claimed in claim 4, wherein said first inlet port is controlled by a first inlet valve and said second inlet port is controlled by a second inlet valve.

7. The system as claimed in claim 5, wherein said first inlet port is annular and surrounds a circular port defining said second inlet port.

* * * * *